W. HAY & T. B. FREEMAN.
Improvement in Cultivators.

No. 116956

Patented JUL 11 1871

Witnesses:
T. C. Brecht
Phil. T. Dodge

Inventors
W. Hay & T. B. Freeman
by Dodge & Munn
Attys.

UNITED STATES PATENT OFFICE.

WILLIAM HAY AND THOMAS B. FREEMAN, OF HILLSBOROUGH, OREGON.

IMPROVEMENT IN GANG-PLOWS.

Specification forming part of Letters Patent No. 116,956, dated July 11, 1871; antedated July 4, 1871.

*To all whom it may concern:*

Be it known that we, WILLIAM HAY and THOMAS B. FREEMAN, of the town of Hillsborough, in the county of Washington, in the State of Oregon, have invented certain Improvements in Gang-Plows, of which the following is a specification:

Our invention relates: 1st, to the manner of mounting the main wheels, so as to be capable of independent vertical adjustment. 2d, to the manner of mounting and arranging the main or plow-frame, so that it may be raised or lowered at will; and 3d, to the manner of arranging the tongue so as to be adjustable laterally.

Figure 1:
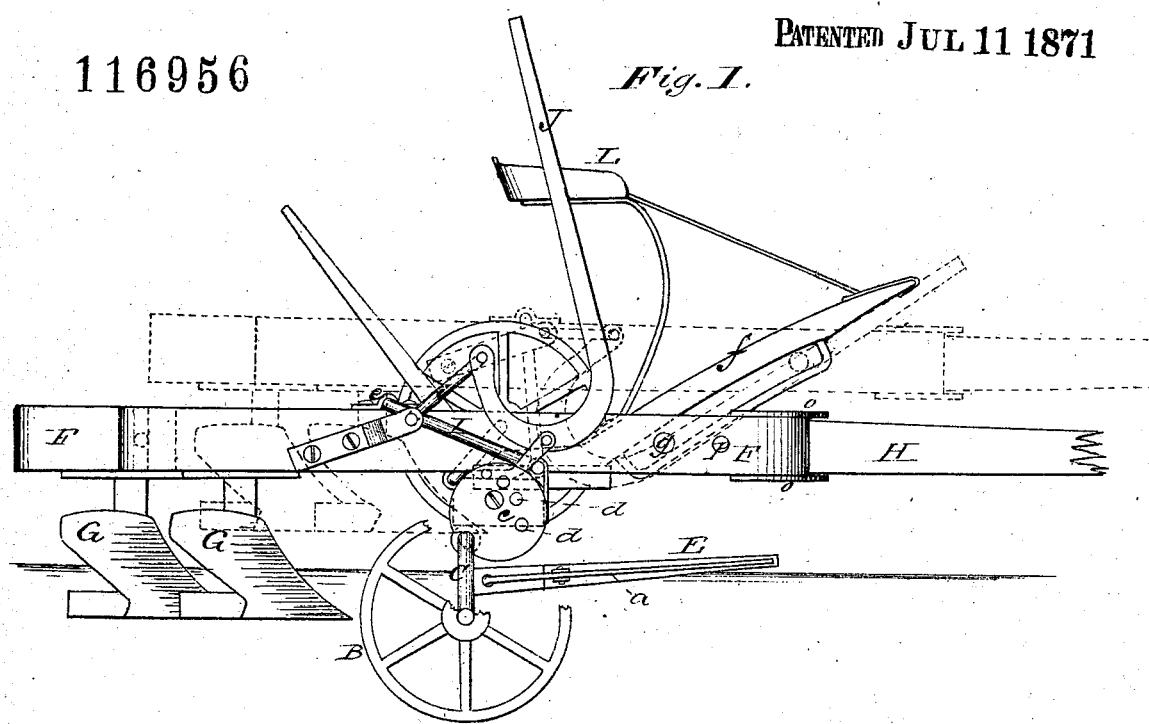
Figure 2:
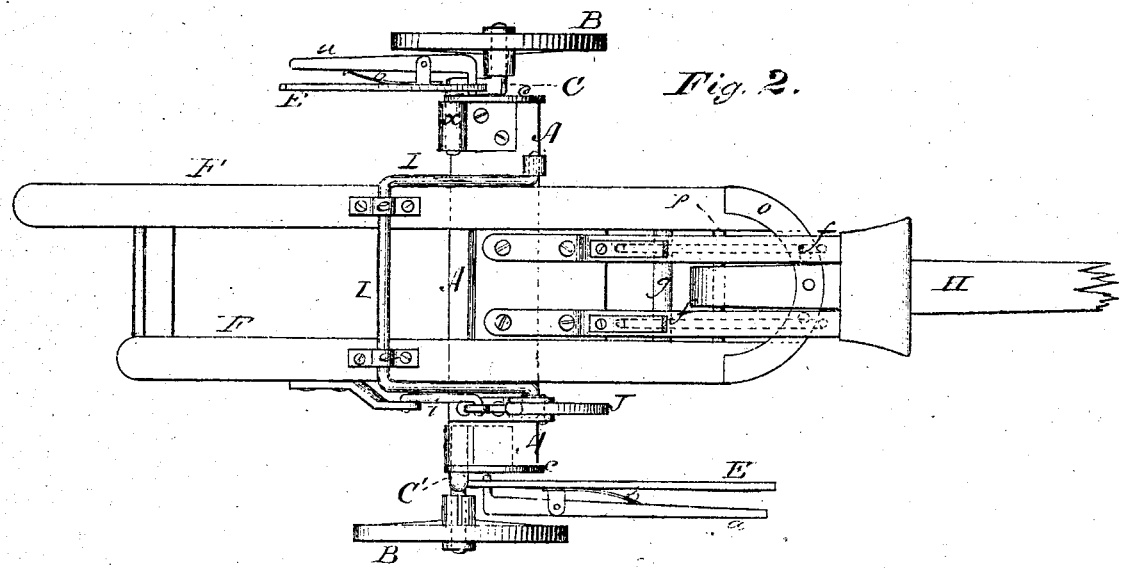

Figure 1 is a side elevation of our plow, and Fig. 2 is a top plan view of the same.

In the drawing, A represents the main axle, which is made of sufficient strength to support the main frame and its plows, and provided at each end with a bent arm or crank-axle, C, on each of which latter is mounted one of the main supporting-wheels B. Each of these crank-axles consists of a bar, provided at one end with an inwardly extending shaft or journal, which is mounted in a strong box or bearing on the axle A, and provided at the opposite end with an outwardly-projecting journal to receive the wheel B. By turning these crank-axles the wheels B may be raised or lowered as desired in relation to the axle A. The crank C, at one end of the axle A, is attached to the upper side thereof, while the one at the opposite end is attached to the under side, as shown in Figs. 1 and 2, for purposes hereinafter described. A hand-lever, E, is rigidly secured to each of the crank-axles for operating the same, and to the outer side of each of these levers is pivoted another lever, $a$, the lower end of which is bent inward and projects through a hole in the lever E; and behind the upper end of the lever $a$ is secured a spring, $b$, to press the lower end of the lever inward. To each end of the main axle A is secured a plate, $c$, provided with a series of holes, $d$, all equidistant from the journal of the crank-axle, and into any one of which the lower end of lever $a$ may be locked, so as to hold the lever E in any required position, and thereby the wheels B at any height desired. By this arrangement of parts it will be seen that the two wheels may be adjusted independently of each other, and thus the main axle A supported at any required height from the ground, and with either end higher than the other. F is the main or plow-frame, composed of two parallel bars secured together, having the two plows G secured rigidly under its back end, and a tongue, H, attached to the front end. This frame is placed across the main axle A, and secured loosely thereto by means of a metal bar or frame, I, of an inverted U-form. The middle or horizontal portion of this bar is mounted in boxes $e$, secured on top of the frame F, while its arms extend down outside of the frame and have their ends hinged or pivoted to the main axle A, as shown. By turning the bar I upward upon its lower ends as pivots the frame F is raised upward and moved forward, while, by turning the bar back, the frame is carried back and lowered down so as to rest upon the axle A, as shown in Figs. 1 and 2. To the axle A two forwardly-inclined slotted arms, $f$, are rigidly secured, so as to project up through the frame F; and a bolt, $g$, is passed transversely through the frame and these arms, as shown in Figs. 1 and 2. As the frame F is moved up and down the bolt $g$ slides in the slotted arms $f$, and the axle A is thereby prevented from turning over, as it would otherwise be liable to do. A hand-lever, J, having its lower end bent into a U-form, is also provided, and pivoted, at the middle of its bent or curved portion, to the axle A, as shown. To the short arm of this lever, which projects above the pivot, is connected a link, $i$, which has its rear end pivoted to the side of frame F, as shown. By throwing the hand-lever forward the link $i$ is caused to elevate the frame F and lift the plows above the ground, as shown in dotted lines in Fig. 1. When the frame is thus elevated the arms of bar I are brought to or carried a little forward of a vertical position, so as to support the frame and prevent it from falling back. By moving the hand-lever backward the bar I is turned back and the frame F allowed to drop down and rest on the axle A, so that the plows can enter the ground. The front end of the bars of the main frame are connected by two plates, $o$, one on the upper and the other on the lower side, and the rear end of the tongue H is inserted between these plates and mounted loosely on a rod, $p$, passing transversely through the frame. The tongue thus arranged may be adjusted laterally on the rod, and fastened at any point by means of a pin inserted through one of a series of holes made in the plates for the purpose, as shown in Fig. 2. On the axle A is mounted a seat, L, for the driver, and on the arms *f* a foot-board, as shown.

In operating the plow the team is attached to the tongue H, the lever J thrown back so as to lower the frame, and the crank-axles C adjusted to regulate the depth to which the plows cut, and the team then started. As the machine proceeds the plows G turn their two furrows in the usual manner. In going to or from the field and in turning the plow the hand-lever is thrown forward so as to raise the plows out of the ground. By adjusting the levers E the wheels may be raised or lowered, as necessary, when one wheel runs in a furrow or when working on hill-side land.

Having thus described our invention, what we claim is—

1. The frame F having the plows G attached, in combination with the axle A having the arms *f* attached, the frame and axle being connected by the hinged rod or stirrup I, substantially as described.

2. The axle A, having the plates *c* secured to each end, in combination with the bent arms C having the lever E and catch *a* rigidly attached thereto, said arms being pivoted one to the upper and the other to the lower side of the axle, substantially as set forth.

WILLIAM HAY.
THOMAS B. FREEMAN.

Witnesses:
J. H. MITCHELL,
J. N. DOLPH.